(12) United States Patent  
Johnston

(10) Patent No.: US 8,037,413 B2  
(45) Date of Patent: Oct. 11, 2011

(54) BRUSH TOOL FOR AUDIO EDITING

(75) Inventor: David E. Johnston, Duvall, WA (US)

(73) Assignee: Adobe Systems Incorporated, San Jose, CA (US)

( * ) Notice: Subject to any disclaimer, the term of this patent is extended or adjusted under 35 U.S.C. 154(b) by 925 days.

(21) Appl. No.: 12/022,668

(22) Filed: Jan. 30, 2008

(65) Prior Publication Data

US 2009/0070674 A1 Mar. 12, 2009

Related U.S. Application Data

(60) Provisional application No. 60/967,829, filed on Sep. 6, 2007.

(51) Int. Cl.
*G06F 3/00* (2006.01)
(52) U.S. Cl. .......... 715/716; 715/727; 704/278
(58) Field of Classification Search .......... 715/716, 715/727; 704/200–278
See application file for complete search history.

(56) References Cited

U.S. PATENT DOCUMENTS

| | | | | |
|---|---|---|---|---|
| 5,684,927 | A | | 11/1997 | Mirkowicz |
| 5,689,618 | A | * | 11/1997 | Gasper et al. ............... 704/276 |
| 6,560,400 | B1 | * | 5/2003 | Sumiyoshi et al. .......... 386/201 |
| 7,464,034 | B2 | * | 12/2008 | Kawashima et al. ......... 704/266 |
| 2007/0188510 | A1 | * | 8/2007 | Kokemohr ..................... 345/581 |
| 2007/0268304 | A1 | * | 11/2007 | Hsu ............................... 345/592 |

FOREIGN PATENT DOCUMENTS

EP 0 829 821 A2 3/1998
WO WO 03/046913 A1 6/2003

OTHER PUBLICATIONS

User Guide Adobe Photoshop 5.0 XP-002292591 Jan. 1998.*
Audio Brush: Smart Audio Editing in the Spectrogram XP-002500056 Apr. 2006.*
Boogaart, "Audio Brush: Smart Audio Editing in the Spectrogram," Institut Für Informatik, Universität Augsburg, [Online] Apr. 2006, 10 pages.
Adobe Systems Inc.: "Adobe Audition 3: Professional Audio Recording, Mixing, Editing and Mastering" [Online] Jul. 26, 2007, San Jose, CA, Retrieved from the Internet: URL: http://www.adobe.com/products/audition/pdfs/Audition3_WhatsNew_FINAL.PDF>[retrieved on Oct. 15, 2008] the whole document, 5 pages.
Pandaa Jonas Aström: "Frequency" Mac Products Guide, [Online], Feb. 27, 2005, Retrieved from the Internet: URL:http://guide.apple.com/action.lasso?-database-macosguide&-layout=cgi_detail&-response=/ussearch/detail.html&prodkey=63989&-search> [retrieved on Oct. 15, 2008] the whole document, 1 page. Anonymous, "Adobe Photoshop 5.0 User Guide, Chapter 9—Painting" Adobe Photoshop 5.0 User Guide, XX, XX, Jan. 1, 1998, pp. 197-222.
International Search Report and Written Opinion from corresponding International Application No. PCT/US2008/074846, mailed Oct. 28, 2008.

* cited by examiner

*Primary Examiner* — Weilun Lo
*Assistant Examiner* — Anil Bhargava
(74) *Attorney, Agent, or Firm* — Fish & Richardson P.C.

(57) ABSTRACT

This specification describes technologies relating to editing digital audio data. In some implementations, a computer-implemented method is provided. The method includes displaying a visual representation of audio data, receiving an input selecting a selected portion of audio data within the visual representation, the selecting including applying a brush tool to the visual representation of the audio data, and editing the selected portion of audio data including determining a degree of opacity for the selected audio data and applying an editing effect according to the degree of opacity.

48 Claims, 6 Drawing Sheets

BRUSH TOOL FOR AUDIO EDITING

CROSS-REFERENCE TO RELATED APPLICATIONS

This application claims the benefit under 35 U.S.C. §119(e) of Provisional U.S. Patent Application Ser. No. 60/967,829, filed on Sep. 6, 2007, which is incorporated here by reference.

BACKGROUND

This specification relates to editing digital audio data.

Different visual representations of audio data are commonly used to display different features of the audio data. For example, an amplitude display shows a representation of audio intensity in the time-domain (e.g., a graphical display with time on the x-axis and intensity on the y-axis). Similarly, a frequency spectrogram shows a representation of frequencies of the audio data in the time-domain (e.g., a graphical display with time on the x-axis and frequency on the y-axis).

The audio data can be edited. For example, the audio data may include noise or other unwanted audio data. Removing unwanted audio data improves audio quality (e.g., the removal of noise components provides a clearer audio signal). Alternatively, a user may apply different processing operations to portions of the audio data to generate particular audio effects.

SUMMARY

This specification describes technologies relating to editing digital audio data.

In general, in one aspect, a computer-implemented method is provided. The method includes displaying a visual representation of audio data, receiving an input selecting a selected portion of audio data within the visual representation, the selecting including applying a brush tool to the visual representation of the audio data, and editing the selected portion of audio data including determining a degree of opacity for the selected audio data and applying an editing effect according to the degree of opacity. Other embodiments of this aspect include corresponding systems, apparatus, and computer program products.

Implementations of the aspect can include one or more of the following features. Selecting audio data within the visual representation can include applying the brush tool to a plurality of non-contiguous regions of the visual representation of the audio data. Applying the brush tool can further include varying the application of the brush tool according to a rate at which the brush is moved relative to the visual representation of the audio data. Applying the brush tool can further include varying the application of the brush tool according to a number of passes of the brush tool over a particular point of the visual representation of the audio data.

The visual representation can be a frequency spectrogram and determining a degree of opacity for the selected audio data can further include generating a mask image corresponding to the brush application within the selected audio data, dividing the mask image into a grid including a plurality grid boxes with respect to specified time intervals and frequency bands, and determining an opacity value for each grid box as a function of the brush tool application within that grid box. Applying an editing operation according to the degree of opacity can include determining a minimum and maximum amount of the editing effect to apply to the selected audio data and determining an amount of the editing effect to apply to a particular point of audio data in the selected audio data as a function of the minimum and maximum amounts and the opacity value associated with the particular point of audio data.

The aspect can further include isolating a portion of the audio data, the portion corresponding to the selected portion of audio data within the visual representation. The aspect can further include updating the displayed visual representation according to the applied editing effect. The aspect can further include storing edited audio data after applying the editing effect.

In general, in another aspect, a computer-implemented method is provided. The method includes displaying a visual representation of audio data, receiving an input selecting audio data within the visual representation, the selecting including applying a brush tool to the visual representation of the audio data, and automatically performing a correction operation on the selected audio data to form edited audio data. Other embodiments of this aspect include corresponding systems, apparatus, and computer program products.

Implementations of the aspect can include one or more of the following features. Performing the healing operation can include identifying a bounding rectangle surrounding the selected audio data and applying the healing operation to all audio data within the bounding rectangle. Performing the healing operation can further include identifying a plurality of frequency bands associated with the selected audio data, and interpolating at least one feature of the audio data over time with respect to each identified frequency band of the plurality of frequency bands.

Interpolating a feature for a particular frequency band can further include identifying a first value for the feature of audio data occurring within a specified time prior to the selected audio data of the particular frequency band, identifying a second value for the feature of audio data occurring within a specified time after the selected audio data of the particular frequency band, and interpolating the feature of the audio data for the particular frequency band using the first value and the second value. The feature can be an intensity value. The specified time can correspond to a specified number of samples. The edited audio data can be stored.

Particular embodiments of the subject matter described in this specification can be implemented to realize one or more of the following advantages. A user can automatically correct (e.g., heal) audio data by applying a brush tool to a displayed representation of the audio data. Correcting audio data following modifications (e.g., from applying editing effects) improves audio quality including removing undesirable noise caused by discontinuities at edit boundaries of the audio data. Interpolating values of audio data for particular frequency bands provides a smoother transition across edit boundaries than cross-fading provided by mixing audio data on each side of an edit boundary.

A user can vary the magnitude of an applied editing effect by applying the brush tool such that the brush tool application provides a variable opacity. Using the brush tool provides a finer control over the selection of audio data compared to a rectangular selection tool. The brush tool can be used to finely select particular sounds in the displayed audio data that change, e.g., with frequency. For example, particular sounds (e.g., bird chirps) can be enhanced or removed by simply brushing over the visual representation corresponding to those sounds and applying an editing effect. Application of the brush tool can be non-contiguous such that the brush tool can be applied to select different regions of the displayed audio data during a single operation. The editing effect can then be applied to all selected regions at once, simplifying audio editing operations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
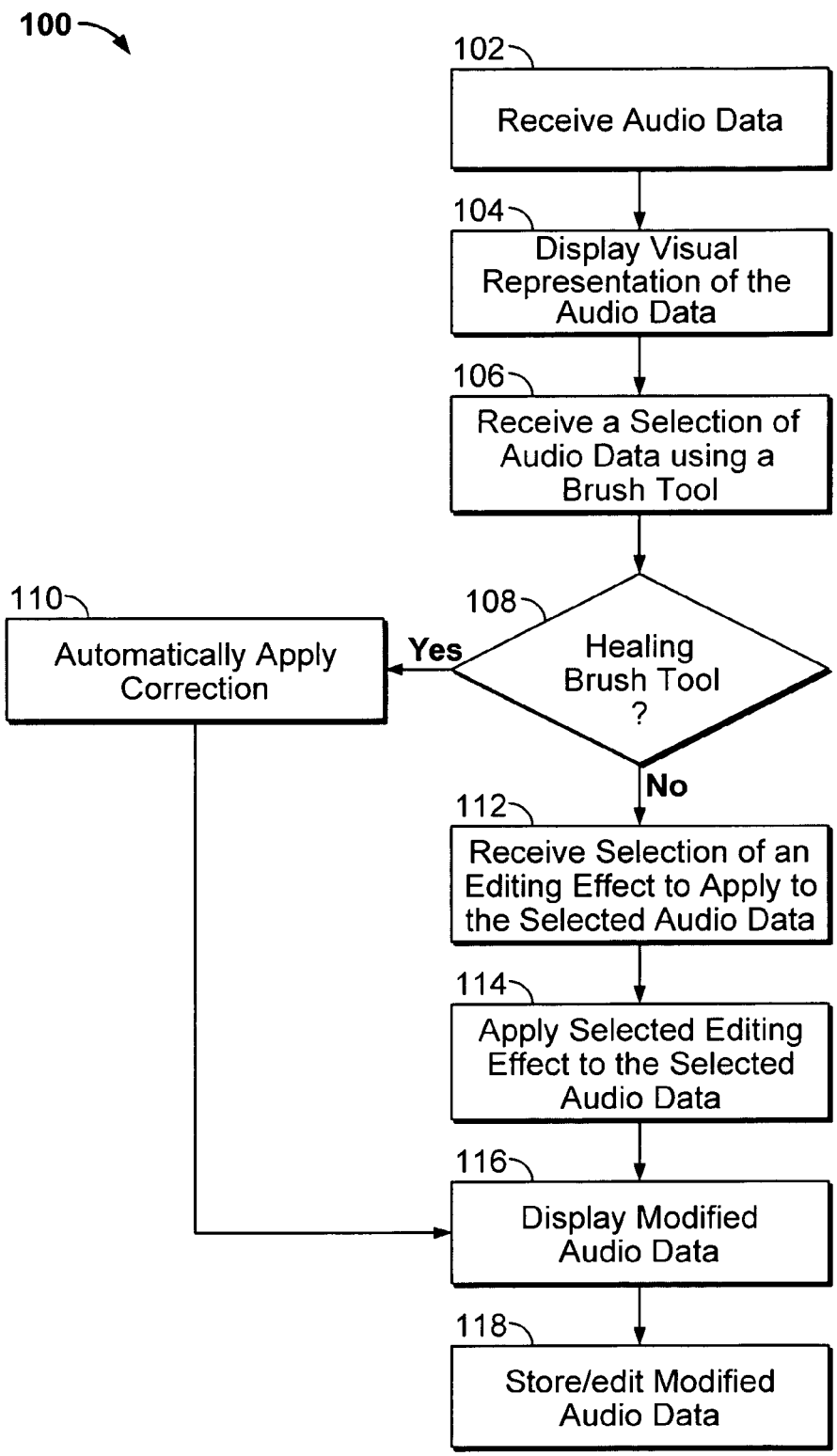
FIG. 1 is a flowchart of an example method for using a brush tool to edit audio data.

FIG. 1 is a flowchart of an example method 100 for using a brush tool to edit audio data. For convenience, the method 100 will be described with reference to a system (e.g., an audio editing system) that performs the method 100.

The system receives digital audio data (step 102). The audio data is received, for example, as part of an audio file (e.g., a WAV, MP3, or other audio file). The audio file can be locally stored or retrieved from a remote location. The audio data can be received, for example, in response to a user selection of a particular audio file.

The system displays a visual representation of the audio data (step 104). For example, the system can plot and display a particular feature of the audio data in a window of a graphical user interface. The visual representation can be selected to show a number of different features of the audio data (e.g., frequency, amplitude, phase, or pan). In some implementations, the visual representation displays a feature of the audio data on a feature axis and time on a time axis. For example, visual representations can include a frequency spectrogram, an amplitude waveform, a pan position display, or a phase display.

In some implementations, the visual representation is a frequency spectrogram. The frequency spectrogram shows audio frequency in the time-domain (e.g., a graphical display with time on the x-axis and frequency on the y-axis). Additionally, the frequency spectrogram can show intensity of the audio data for particular frequencies and times using, for example, color or brightness variations in the displayed audio data. In some alternative implementations, the color or brightness can be used to indicate another feature of the audio data e.g., pan position. In other implementations, the visual representation is a pan position display. The pan position display shows audio pan position (i.e., left and right spatial position) in the time-domain (e.g., a graphical display with time on the x-axis and pan position on the y-axis). Additionally, the pan position display can indicate another audio feature (e.g., using color or brightness) including intensity and frequency.

Figure 2:
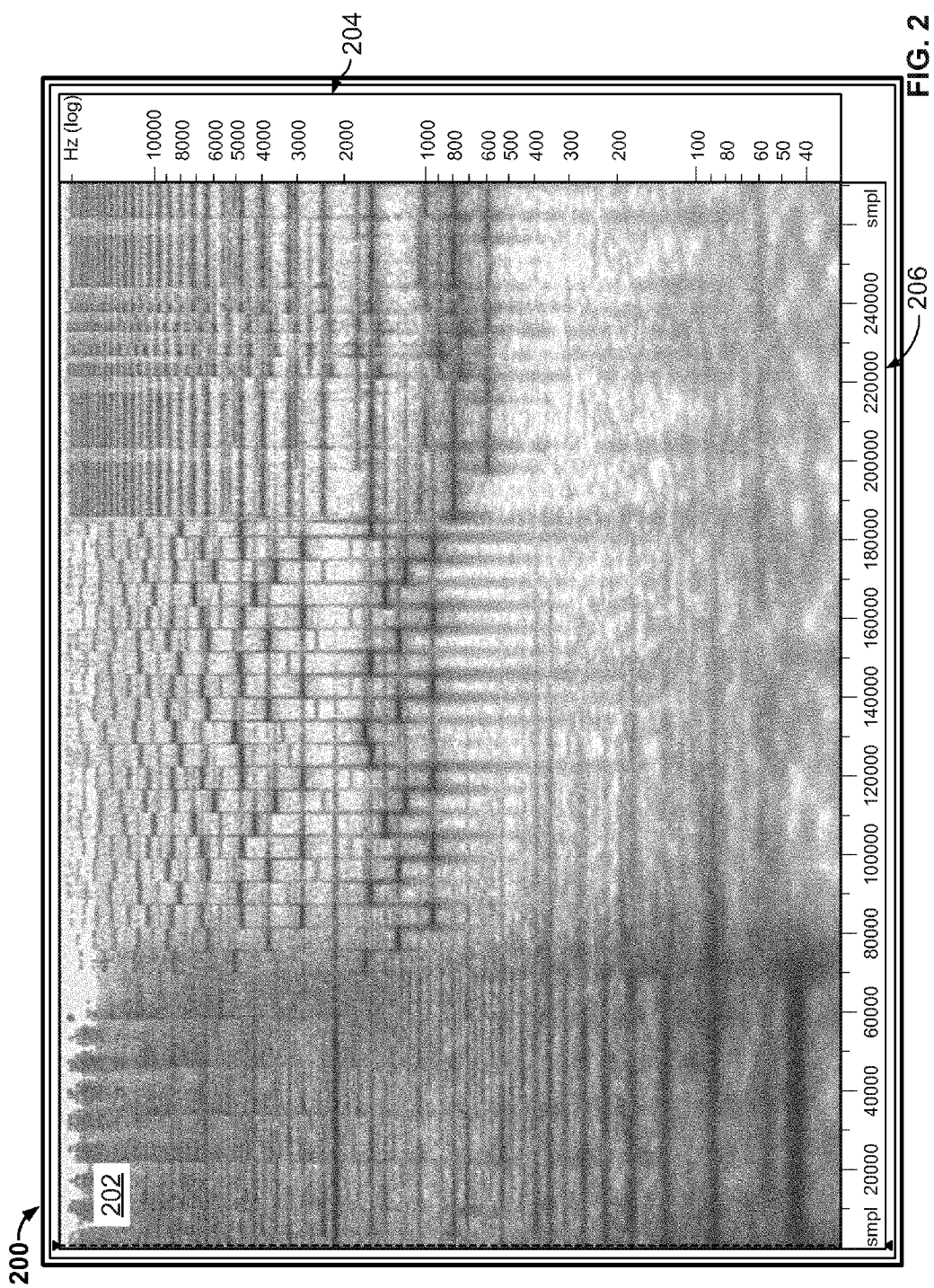
FIG. 2 is an example display of audio data.

FIG. 2 is an example display 200 of a frequency spectrogram 202. The display 200 shows frequency on the y-axis 204 and time and the x-axis 206 (represented as a number of samples at a specified sample rate per unit time). The frequency spectrogram 202 shows spectral lines indicating the frequency of audio data with respect to time. In some implementations, (not shown) the spectral lines of the frequency spectrogram 202 are colored or otherwise indicate (e.g., according to brightness) another audio feature (e.g., intensity of the audio data at that frequency and time).

The system receives a selection of audio data using a brush tool (step 106). In particular, a user can interact with the displayed visual representation of the audio data using a brush tool to identify a particular selection of the audio data (e.g., a selected region of audio data). The brush tool can be a brush similar to brush tools found in graphical editing applications, for example, a paint brush tool or a spray can brush tool. In some implementations, a user selects a particular brush tool from a menu or toolbar including several different selectable brush tools, for example, each having a different brush shape. In addition to different brush shapes, individual brush tools can provide specific editing functions. For example, the system can provide a separate brush tool for applying an automatic healing effect. Other brush tools can be generic for generating a selected region of the displayed visual representation of the audio data. The user can then specify a particular action, for example one or more editing effects, to apply to the selected audio data.

In some implementations, the user selects a particular brush size for the selected brush tool. The brush size determines how much of the displayed audio data is covered by application of the brush on the displayed audio data. Thus, a user can select different sized brushes in order to select a different amount of audio data as the brush tool is manipulated relative to the displayed audio data. Alternatively, the system automatically selects a default brush size.

The user selects audio data using the brush tool by manipulating the brush tool relative to the displayed audio data. For example, the user can use an input device (e.g., a mouse or touchpad) to control the movement of the brush tool. A mouse click or other input can be used to start and stop the application of the brush tool to the displayed audio data. The application of the brush tool can provide a selection of an arbitrary region of the displayed audio data.

In some implementations, movement of the brush tool provides a path indicating where the brush tool has been applied to select audio data (e.g., regions of the display corresponding to selected audio data to which an effect can be applied). For example, the path can be a visible path having a width corresponding to the brush tool size and a length continuing as long as the brush tool is being applied to the displayed audio data. The path can be in a particular color (e.g., white) or tint as well as fully opaque or translucent.

In some implementations, the application of the brush tool is varied according to how the brush tool is manipulated. The coverage of the brush path formed by the movement of the brush tool can vary. For example, a "spray can" brush tool can produce a spatter pattern of brush coverage as the brush tool is manipulated, leaving areas covered by the brush and areas uncovered by the brush along the brush path.

For example, the path coverage can vary depending on the rate at which the brush tool is moved as well as the number of times the brush tool is passed over a particular portion of the displayed audio data. In some implementations, moving the brush tool quickly applies less path coverage than moving the brush tool slowly over the same portion of the audio data. Additionally, passing the brush tool over a portion of the audio data more than once can have an accumulating effect on the path coverage. The degree of coverage along the path can provide a degree of opacity from fully opaque (e.g., no underlying displayed audio data visible) to zero opacity (zero coverage by the brush tool). In some implementations, the varied opacity of the displayed path can vary the degree to which an editing effect is applied on the selected audio data, which is described in greater detail below.

In some implementations, the user can generate more than one selection of audio data using the brush tool before applying a specified editing effect. For example, the user can use the brush tool to select audio data at a first location in the displayed representation of audio data and then use the brush tool to select audio data at a second location. For example, the user can select and hold a key (e.g., a shift key) while making multiple brush tool selections. The first and second locations can be non-contiguous.

In other implementations, the generated brush paths (e.g., an overall brush pattern) are modified after the user has generated a selection. For example, the user can change the size of the brush, which will retroactively adjust the brush pattern according to the new brush size. In another example, the brush pattern can be treated as a single image after generation such that the user can move the entire brush pattern to a different location relative to the displayed visual representation of audio data. Additionally, in some implementations, the user adjusts the size of the brush pattern, for example, by stretching a side or a corner bounding the brush pattern image.

Figure 3:
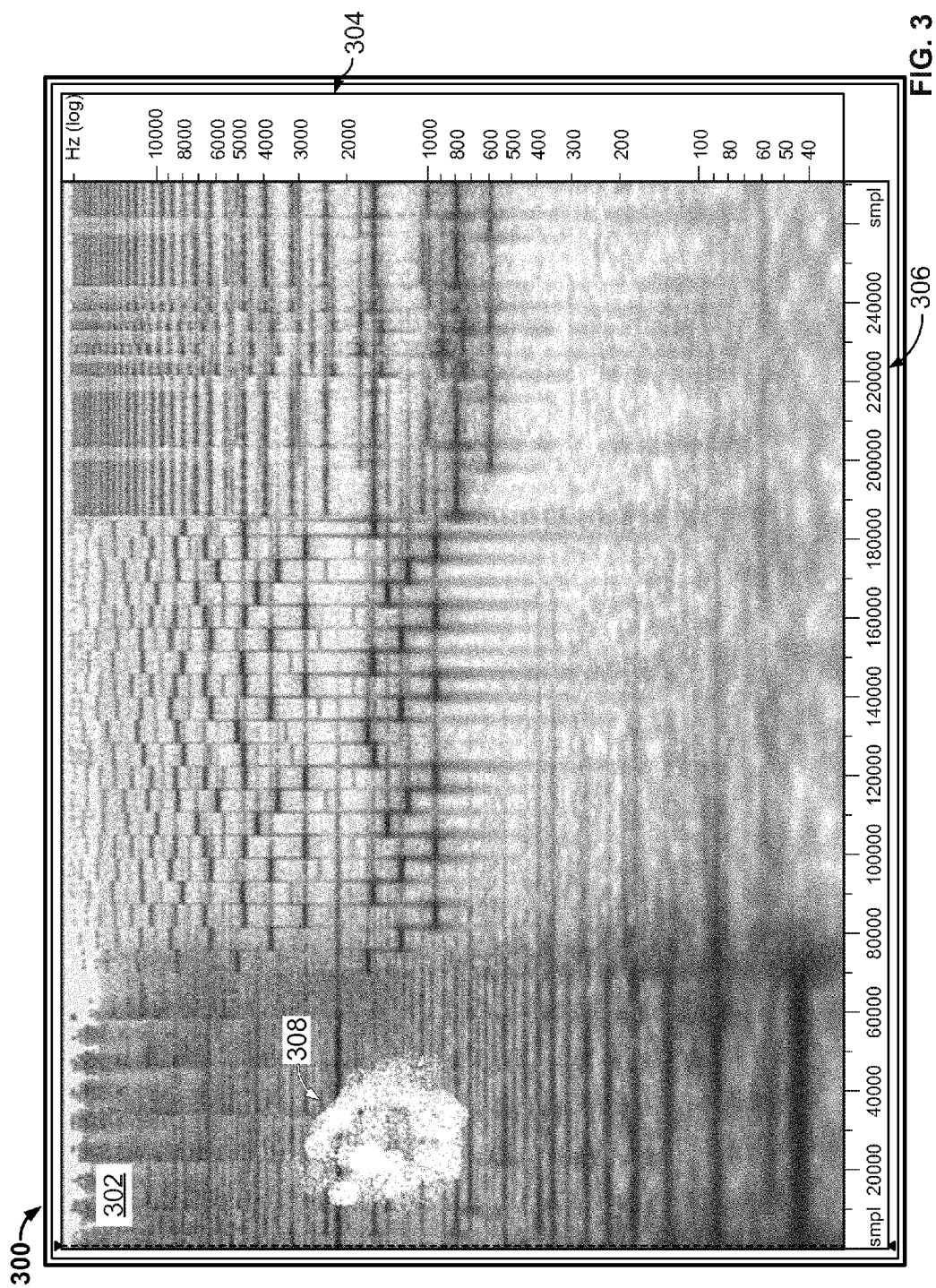
FIG. 3 is an example display of audio data including a selection of audio data selected using a brush tool.

FIG. 3 is an example display 300 of audio data including a selection of audio data selected using a brush tool. The display 300 includes a frequency spectrogram 302, a y-axis 304 showing frequency, and an x-axis 306 showing time. The frequency spectrogram 302 includes a selection region 308 formed using a brush tool. The selection region 308 shows the varied coverage that can be applied by the application of the brush tool. Selection region 308 shows some portions that are fully covered (opaque) and other portions have different degrees of coverage. In areas that are fully covered, the display of the audio data is fully obscured.

When the brush tool is identified as a healing brush tool (step 108), the system automatically applies a correction (e.g., a healing effect) to the selected audio data (step 110). The system applies the automatic correction, for example, when previous editing operations have resulted in discontinuities in the audio data at the edit boundaries (e.g., a boundary where audio data has been deleted or inserted).

Figure 4:
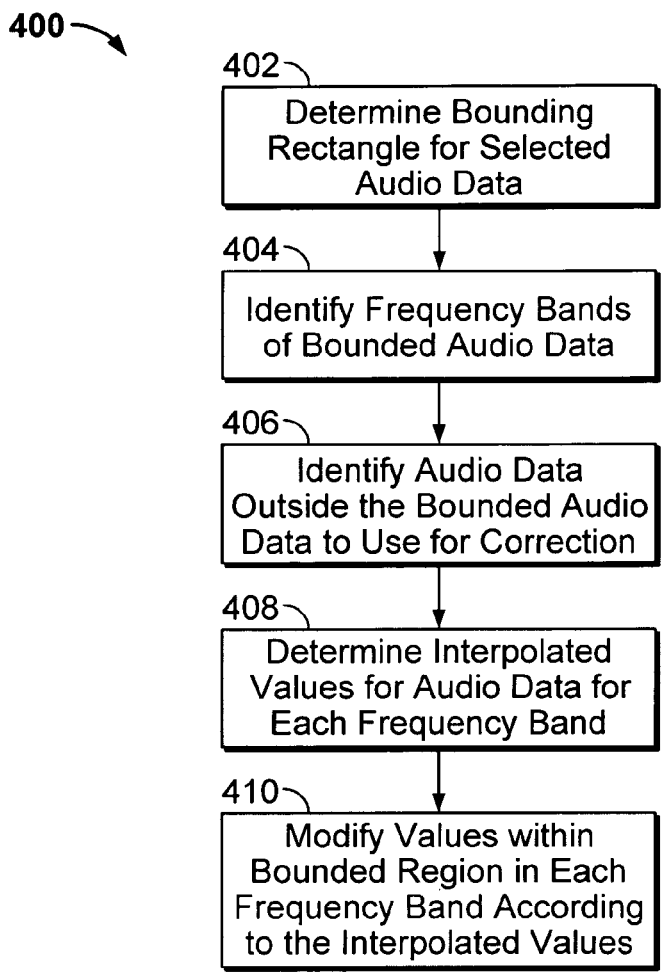
FIG. 4 is a flowchart of an example method of applying healing to audio data.

FIG. 4 is a flowchart of an example method 400 for automatically applying a correction (e.g., healing operation) to selected audio data. For convenience, the method 400 is described with respect to a system that performs the method 400. The system determines a bounding rectangle for the selected audio data (step 402). In some implementations, the system determines a bounding rectangle as a smallest rectangle that encompasses the selected audio data (e.g., the selected region to which the brush tool was applied even though there can be varied coverage shown). In some alternative implementations, the selected audio data is bounded by a polygon, a plurality of polygons according to frequency bands, or other shapes that provides a closer fit to the selected audio data.

The system identifies frequency bands within the bounded audio data (step 404). For example, for a selected region of a frequency spectrogram, the frequency bands can be identified according to the range of frequencies bounded by the bounding rectangle (e.g., the y-axis height of the bounding rectangle). The height of each frequency band can be specified by default system settings or specified according to a user input. For example, in some implementations, each frequency band has a height of 1000 Hz. In some implementations, the frequency is displayed according to a log scale and the height of the frequency bands are adjusted accordingly.

The system identifies audio data outside the bounded audio data to use for correcting the audio data within the bounding rectangle (step 406). In some implementations, the system uses audio data from a specified number of samples before and after the bounding rectangle. Alternatively, in other implementations, the system uses audio data from a specified number of samples before and after the border of the bounding rectangle with respect to each frequency band. Thus, for example, if the bounding rectangle is diagonally positioned with respect to the display axes of the frequency spectrogram, the identified audio data outside the bounded audio data can vary in time by frequency band.

Alternatively, in other implementations, the system uses audio data from a specified number of samples before and after the selected audio data (e.g., the actual brush paths) with respect to each frequency band. Thus, the system can use using audio data closer to the pattern of the actual brush paths (but not overlapping them) than when using the bounding rectangle as a whole.

The number of samples can be specified according to default system values or previously entered values specified by the user. For example, the system can identify audio data over 400 samples before the bounding rectangle and 400 samples after the bounding rectangle with respect to each frequency band. If the sample rate is 44 kHz, the sample interval is substantially 1/44,000 seconds. Therefore, the audio data identified for each frequency band is the audio data occurring within 1/440 seconds of each side of the bounding rectangle.

The system identifies the intensity (i.e., amplitude) values of the audio data within the identified audio data before and after each frequency band. For example, for a first frequency band having a range from 0-100 Hz, the system identifies the intensity over the 400 samples prior to the bounding rectangle of the first frequency band and the 400 samples following the bounding rectangle of the first frequency band (e.g., using Fourier Transforms).

The system can use, for example, Fourier Transforms to separate out the frequencies of each band in order to identify the intensity of the audio data within the band for a number of points within the 400 samples on each side of the bounding rectangle. In some implementations, the system determines the average intensity within the samples before and after the bounding rectangle for each frequency band.

The system determines interpolated values for audio data within the bounding rectangle for each frequency band (step 408). In some implementations, a linear interpolation is determined from the intensity value before the bounded audio data of the frequency band to the intensity value after the bounded audio data of the frequency band. For example, if the intensity of a first frequency band is −20 dB over a specified number of samples before the bounded audio data and −10 dB over a specified number of samples following the bounded audio data, the system determines interpolated intensity values from −20 dB to −10 dB linearly across the audio data of the first frequency band within the bounded audio data. In other implementations, different interpolation methodologies can be applied, including non-linear interpolation. The interpolation can be used to provide a smooth transition of intensity from one side of the bounded audio data to the other for each individual frequency band. For example, the interpolation can provide a smooth transition across an edit boundary discontinuity in the audio data identified by the user using the brush tool.

The system modifies values within the bounded audio data in each frequency band according to the interpolated values (step 410). For audio data within the bounded audio data the intensity values at each point in time are modified to correspond to the interpolated intensity values. This is performed for each frequency band such that the overall result provides a smooth transition of all the audio data within the bounded audio data. In some implementations, the region of audio data, including the interpolated values, is pasted over the previous audio data in order to replace the audio data with the corresponding interpolated audio data.

As shown in FIG. 1, when the brush tool is not identified as a healing brush tool (step 108), the system receives a selection of an editing effect to apply to the selected audio data. For example, the system can apply a gain effect to amplify or attenuate the selected audio data. Other effects that the system can apply include copying and pasting selected audio data. For example, the user can copy audio data corresponding to background sounds. The user could then apply the brush tool to the displayed audio data generating a region of selected audio data, delete that selected audio data, and then replace the selected audio data with the copied audio data of background sounds.

The system applies the selected editing effect to the selected audio data (step 110). The system can apply the selected editing effect uniformly to the selected audio data. Alternatively, the system can apply the selected editing effect as a function of opacity corresponding to the coverage of the audio data provided by the application of the brush tool to the displayed audio data.

Figure 5:
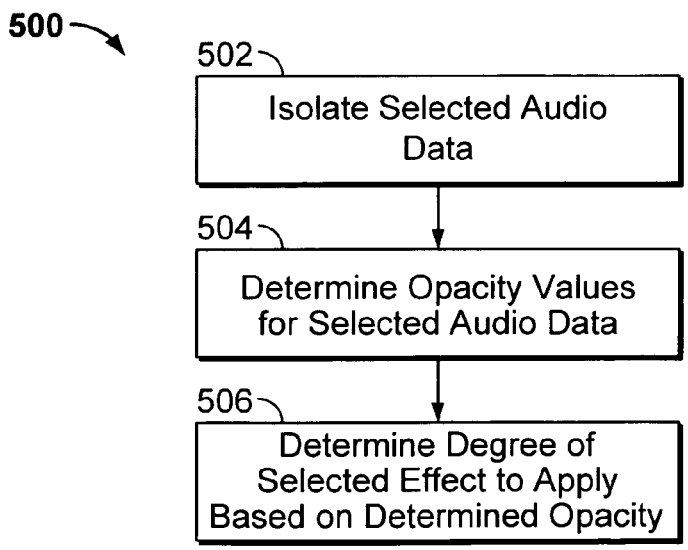
FIG. 5 is a flowchart of an example method of applying an editing effect to selected audio data.

FIG. 5 is a flowchart of an example method 500 for editing selected audio data, for example, selected in a frequency spectrogram display of audio data. To apply a selected editing effect, the selected audio data is isolated from the audio data as a whole (step 502). The editing effect can then be applied to the isolated audio data.

Figure 6:
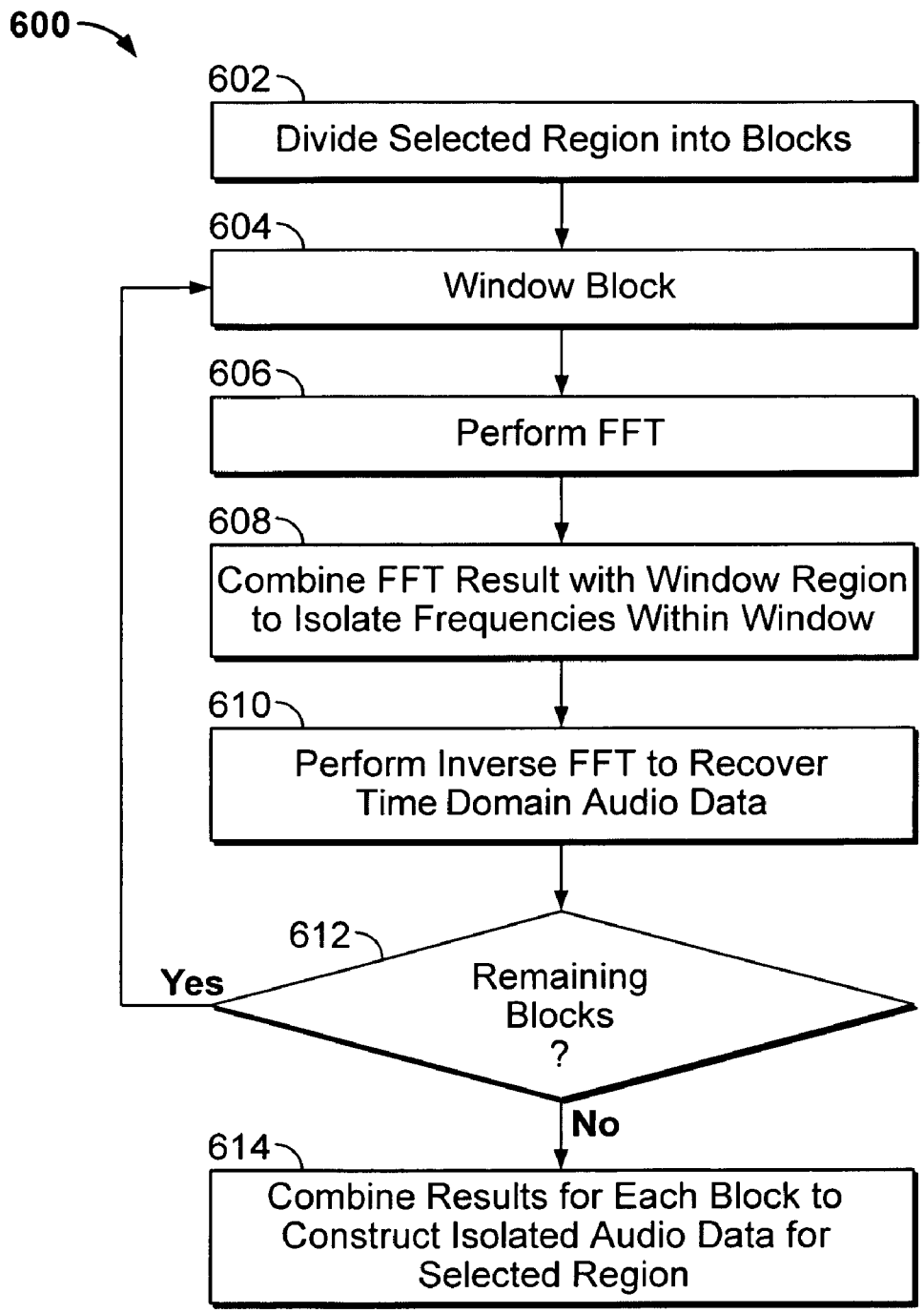
FIG. 6 is a flowchart of an example method for isolating selected audio data.

FIG. 6 shows an example process 600 for isolating the portion of the audio data corresponding to a selected region of the displayed audio data. The selected region is the portion of the displayed audio data corresponding to the path of the applied brush tool.

The system divides the selected region into a series of blocks (step 602). In one implementation, the blocks are rectangular units, each having a uniform width (block width) in units as a function of time. The amount of time covered by each block is selected according to the type of block processing performed. For example, when processing the block according to a short time Fourier transform method, the block size is small (e.g., 10 ms). Additionally, the height of each block is designed to match the contours of the selected region such that each block substantially matches the frequency range of the selected region for the period of time coved by the block.

In one method for creating blocks, each successive block partially overlaps the previous block along the x-axis (i.e., in the time-domain). This is because the block processing using Fourier transforms typically has a greater accuracy at the center of the block and less accuracy at the edges. Thus, by overlapping blocks, the method compensates for reduced accuracy at block edges.

The system processes each block to isolate audio data within the block. For simplicity, the block processing steps are described below for a single block as a set of serial processing steps, however, multiple blocks can be processed substantially in parallel (e.g., a particular processing step can be performed on multiple blocks prior to the next processing step).

The system windows each block (step 604). The window for a block is a particular window function defined for each block. A window function is a function that is zero valued outside of the region defined by the window (e.g., a Blackman-Harris window). Thus, by creating a window function for each block, subsequent operations on the block are limited to the region defined by the block. Therefore, the audio data within each block can isolated from the rest of the audio data using the window function.

The system performs a Fourier transform (e.g., a fast Fourier transform "FFT") to extract the frequency components of a vertical slice of the audio data over a time corresponding to the block width (step 606). The Fourier transform separates the individual frequency components of the audio data (e.g., from zero hertz to the Nyquist frequency). The window function of the block is applied to the FFT results (step 608). Because of the window function, frequency components outside of the block are zero valued. Thus, combining the FFT results with the window function removes any frequency components of the audio data that lie outside of the defined block.

The system performs an inverse FFT on the extracted frequency components for the block to reconstruct the time domain audio data solely from within the each block (step 610). However, since the frequency components external to the bock were removed by the window function, the inverse FFT creates isolated time domain audio data result that corresponds only to the audio components within the block.

The system similarly processes additional blocks (step 612). Thus, a set of isolated audio component blocks are created. The inverse FFT results from each block are then combined to construct isolated audio data corresponding to the portion of the audio data within the selected region (step 614). The results are combined by overlapping the set of isolated audio component blocks in the time-domain. As discussed above, each block partially overlaps the adjacent blocks. In one implementation, to reduce unwanted noise components at the edges of each block, the set of isolated audio component blocks can first be windowed to smooth the edges of each block. The windowed blocks are then overlapped to construct the isolated audio data. The above technique of using FFT's can be used in a similar manner to isolate audio data for other types of visual representations including a pan position display or phase display of audio data.

In other implementations, the selected region of an audio data is isolated using other techniques. For example, instead of Fourier transforms, one or more dynamic zero phase filters can be used. A dynamic filter, in contrast to a static filter, changes the frequency pass band as a function of time, and therefore can be configured to have a pass band matching the particular frequencies present in the selected region at each point in time. Thus, dynamic filtering can be performed to isolate the audio data of a selection region in a display of audio data.

As a result of the isolating, the audio data outside the selected audio data is effectively attenuated to zero, leaving only the selected audio data for the purposes of applying one or more editing effects. After applying one or more editing effects to form edited isolated audio data, the edited isolated audio data can be mixed back into the audio data. The edited isolated audio data replaces the existing audio data corresponding to the selected region.

As shown in FIG. 5, the system determines the opacity of the selected audio data (step 504). The application of the brush tool to the audio data can be separately treated as a mask image having varied intensity values depending on the coverage provided by the brush tool. For example, the mask image can be considered an image that only contains the brushed region and ignores the underlying display of the audio data. Thus, for example, if the path coverage is shown as white, the uncovered portions of the path can be shown as black.

In some implementations, the resultant mask image is divided into a grid as a function of the corresponding feature and time values of the audio data. Thus, if the selected audio data is from a frequency spectrogram, the grid divides the mask image according to frequency and time. For example, time within the selected audio data can be divided into frames having a specified width corresponding to a number of samples (e.g., 256 samples per frame). The frequencies within the selected audio data can be divided into bins each having a specified frequency range (e.g., a bin can have a frequency range from 1,000 to 1,044 Hz). The bins and frames are used to generate a grid within the mask image corresponding to the selected audio data.

The opacity of the mask image is identified for each grid box. The opacity is a color value along a gradient from no color (e.g. no brush coverage at that point) to white (completely covered by the brush tool, i.e., fully opaque). In some implementations, the opacity is given a color value from 0 to 255 where zero is black (no coverage) and 255 is white (fully covered) and where the values between 0 and 255 reflect the varied amounts of coverage. Alternatively, the color can be described a tuple of color values, for example, in the RGB color model.

In some implementations, the system determines the opacity value for each grid box as an average opacity of the portion of the mask image within the grid box. Alternatively, the system can use the opacity at each point within the grid box (e.g., an opacity value for each pixel). In some implementations, the system uses a gamma value to improve contrast the shades of opacity between black and white (e.g., to provide greater contrast in lighter or darker portions of the image mask).

The system determines the degree of the selected effect to apply to each point of audio data based on the determined opacity of the mask image (step 506). The amount or intensity of the editing effect is determined for each point in the selected audio data as a function of the corresponding mask image opacity at that point. For example, the effect can be a multiple from 0 to 1.0 where a multiple of zero is applied where the opacity is zero (e.g., no brush applied) and a multiple of 1.0 is applied (e.g., full effect) for a maximum opacity (e.g., opacity value of 255). The multiple applied can be linear across opacity values.

In some implementations, the average opacity for each grid box is used. Thus, for audio data corresponding to points in a particular grid box, the editing effect is applied to the audio data as a function of the opacity value for that grid box.

If the audio effect is an attenuation effect (i.e., a gain decrease), the amount of attenuation applied to the audio data varies depending on the opacity in the mask image corresponding to the particular point of audio data (e.g., in frequency/time space). A maximum attenuation amount can be applied to audio data where the opacity is white (i.e., maximum opacity) and a minimum attenuation amount can be applied to audio data where the opacity is black (i.e., minimum opacity). For example, each point of audio data within the selected audio data (e.g., a particular frequency and time, for example, t=1.2 s, f=1,000 Hz) is mapped to the corresponding opacity value in the mask image. In some implementations the corresponding opacity value is the average value for the corresponding grid box containing that mapped point. The opacity value is used to determine the amount of attenuation to apply to the audio data at that point. For example, a particular multiple can be applied according to the opacity value. Thus, if the maximum attenuation is 120 dB for maximum opacity and 0 dB for minimum opacity and the multiple based on opacity is 0.5 at a particular point, then the attenuation to be applied at that point is equal to 60 dB.

When gamma is used to accentuate the opacity, the attenuation can be determined according to a gamma modified opacity value, for example as:

$$\text{Attenuation} = \text{Black (dB)} + pow\left(\frac{color}{255}, \text{gamma}\right)(\text{White (dB)} - \text{Black (dB)}).$$

Where, for example, the values of Black(dB) is the minimum amount of attenuation applied where there is zero opacity (e.g., no brush applied) and White(dB) is the maximum amount of attenuation applied where there is full opacity (e.g., white). For example, the attenuation for Black(dB) can be 0 dB attenuation. Similarly, the attenuation for White(dB) can be 120 dB maximum attenuation. The "pow" represents a power function where the first parameter is raised to the power of the second parameter. Thus, power (color/255, gamma) is equivalent to raising (color/255) to the "gamma" power. The value of pow(color/255, gamma) is used to identify the multiple applied to the attenuation. For example, without using gamma, a color of 255 (full opacity) results in a multiple of 1.0. Thus, for the example maximum and minimum attenuation given above, the attenuation would be 120 dB.

As shown in FIG. 1, the system applies the selected editing effect to the audio data (step 114). For each point of audio data in the selected audio data (e.g., for each point of selected audio data identified by a particular frequency and time) the system applies the effect according to the opacity value associated with that point. For example, an attenuation is applied to all of the audio data in the selected audio data according to the determined attenuation amount for each point as a function of opacity at that point. In another example, the opacity at each point can be used to determine an amount to crossfade between the original underlying audio data and effected audio data. Thus, the higher the opacity at a given point, the more the effected audio data is mixed in while the original audio data at the point is correspondingly attenuated (e.g., the effect amount can be equal to 1—the attenuated amount). The amount mixed in can be inversely proportional to the amount the original audio data is attenuated.

The system displays the modified audio data (step 116). The display of the audio data, for example as a frequency spectrogram, can be updated to reflect the changes in the audio data as a result of the applied editing effect. In some implementations, the edited audio data is combined (e.g., mixed, substituted, summed) with the original audio data to form edited audio data, which is then displayed. In some implementations, the system automatically updates the displayed audio data following application of an editing effect that changes the audio data. Alternatively, in some implementations, the user initiates an updated display, for example, by making a particular selection within the interface associated with the displayed audio data.

The system stores or further processes the audio data (step 118). For example, the system can store the modified audio data as a separate audio file. Additionally or alternatively, the user can apply other editing effects to the modified audio data. For example, the user can apply an effect using the same or a different brush tool. Alternatively, the user can apply editing effects using other tools.

Figure 7:
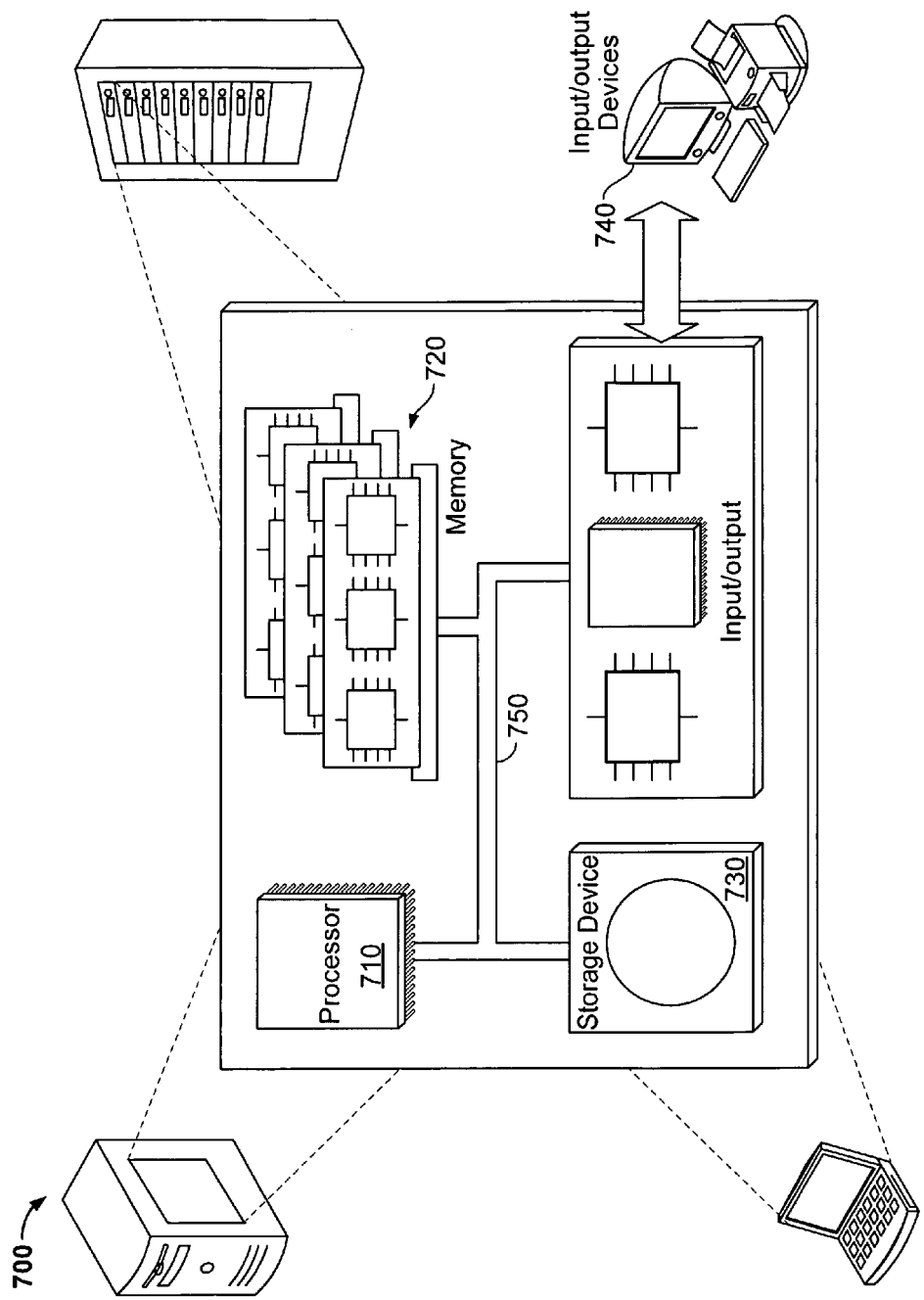
FIG. 7 is a block diagram of an example system for editing audio data.

An example of a computer is shown in FIG. 7, which shows a block diagram of a programmable processing system (system) 700 suitable for implementing apparatus or performing methods of various aspects of the subject matter described in this specification. The system 700 can include a processor 710, a memory 720, a storage device 730, and input/output devices 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 is a computer readable medium such as volatile or non volatile that stores information within the system 700. The memory 720 could store data structures representing history trees and reduced history trees for complex solids, for example. The storage device 730 is capable of providing persistent storage for the system 700. The storage device 730 may be a floppy disk device, a hard disk device, an optical disk device, or a tape device, or other suitable persistent storage means. The input/output device 740 provides input/output operations for the system 700. In one implementation, the input/output device 740 includes a keyboard and/or pointing device. In another implementation, the input/output device 740 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   displaying a visual representation of audio data;
   receiving an input selecting a selected portion of audio data within the visual representation, the selecting including applying a brush tool to the visual representation of the audio data, the brush tool having a particular brush size identifying a coverage area for application of the brush relative to the visual representation of audio data; and
   editing the selected portion of audio data including determining a degree of opacity for the selected audio data and variably applying an editing effect to audio data of the selection according to the degree of opacity.

2. The method of claim 1, where selecting audio data within the visual representation includes applying the brush tool to a plurality of non-contiguous regions of the visual representation of the audio data.

3. The method of claim 1, where applying the brush tool further comprises varying the application of the brush tool according to a rate at which the brush is moved relative to the visual representation of the audio data.

4. The method of claim 1, where applying the brush tool further comprises varying the application of the brush tool according to a number of passes of the brush tool over a particular point of the visual representation of the audio data.

5. The method of claim 1, where the visual representation is a frequency spectrogram and determining a degree of opacity for the selected audio data further comprises:
   generating a mask image corresponding to the brush application within the selected audio data;
   dividing the mask image into a grid including a plurality grid boxes with respect to specified time intervals and frequency bands; and
   determining an opacity value for each grid box as a function of the brush tool application within that grid box.

6. The method of claim 1, where applying an editing operation according to the degree of opacity includes:
   determining a minimum and maximum amount of the editing effect to apply to the selected audio data; and
   determining an amount of the editing effect to apply to a particular point of audio data in the selected audio data as a function of the minimum and maximum amounts and the opacity value associated with the particular point of audio data.

7. The method of claim 1, further comprising:
   isolating a portion of the audio data, the portion corresponding to the selected portion of audio data within the visual representation.

8. The method of claim 1, further comprising:
   updating the displayed visual representation according to the applied editing effect.

9. The method of claim 1, further comprising:
   storing edited audio data after applying the editing effect.

10. A computer-implemented method comprising:
    displaying a visual representation of audio data;
    receiving an input selecting audio data within the visual representation, the selecting including applying a brush tool to the visual representation of the audio data; and
    automatically performing a correction operation on the selected audio data to form edited audio data, the correction operation including using a portion of the audio data from outside the selected audio data to correct the selected audio data.

11. The method of claim 10, where performing the correction operation comprises identifying a bounding rectangle surrounding the selected audio data and applying the correction operation to all audio data within the bounding rectangle.

12. The method of claim 10, where performing the correction operation further comprises:
    identifying a plurality of frequency bands associated with the selected audio data; and
    interpolating at least one feature of the audio data over time with respect to each identified frequency band of the plurality of frequency bands.

13. The method of claim 12, where interpolating a feature for a particular frequency band further comprises:
- identifying a first value for the feature of audio data occurring within a specified time prior to the selected audio data of the particular frequency band;
- identifying a second value for the feature of audio data occurring within a specified time after the selected audio data of the particular frequency band; and
- interpolating the feature of the audio data for the particular frequency band using the first value and the second value.

14. The method of claim 13, where the feature is an intensity value.

15. The method of claim 13, where the specified time corresponds to a specified number of samples.

16. The method of claim 10, further comprising:
- storing the edited audio data.

17. A computer program product, encoded on a non-transitory computer-readable medium, operable to cause data processing apparatus to perform operations comprising:
- displaying a visual representation of audio data;
- receiving an input selecting a selected portion of audio data within the visual representation, the selecting including applying a brush tool to the visual representation of the audio data, the brush tool having a particular brush size identifying a coverage area for application of the brush relative to the visual representation of audio data; and
- editing the selected portion of audio data including determining a degree of opacity for the selected audio data and variably applying an editing effect to audio data of the selection according to the degree of opacity.

18. The computer program product of claim 17, where selecting audio data within the visual representation includes applying the brush tool to a plurality of non-contiguous regions of the visual representation of the audio data.

19. The computer program product of claim 17, where applying the brush tool further comprises varying the application of the brush tool according to a rate at which the brush is moved relative to the visual representation of the audio data.

20. The computer program product of claim 17, where applying the brush tool further comprises varying the application of the brush tool according to a number of passes of the brush tool over a particular point of the visual representation of the audio data.

21. The computer program product of claim 17, where the visual representation is a frequency spectrogram and determining a degree of opacity for the selected audio data further comprises:
- generating a mask image corresponding to the brush application within the selected audio data;
- dividing the mask image into a grid including a plurality grid boxes with respect to specified time intervals and frequency bands; and
- determining an opacity value for each grid box as a function of the brush tool application within that grid box.

22. The computer program product of claim 17, where applying an editing operation according to the degree of opacity includes:
- determining a minimum and maximum amount of the editing effect to apply to the selected audio data; and
- determining an amount of the editing effect to apply to a particular point of audio data in the selected audio data as a function of the minimum and maximum amounts and the opacity value associated with the particular point of audio data.

23. The computer program product of claim 17, further operable to perform operations comprising:
- isolating a portion of the audio data, the portion corresponding to the selected portion of audio data within the visual representation.

24. The computer program product of claim 17, further operable to perform operations comprising:
- updating the displayed visual representation according to the applied editing effect.

25. The computer program product of claim 17, further operable to perform operations comprising:
- storing edited audio data after applying the editing effect.

26. A computer program product, encoded on a non-transitory computer-readable medium, operable to cause data processing apparatus to perform operations comprising:
- displaying a visual representation of audio data;
- receiving an input selecting audio data within the visual representation, the selecting including applying a brush tool to the visual representation of the audio data; and
- automatically performing a correction operation on the selected audio data to form edited audio data, the correction operation including using a portion of the audio data from outside the selected audio data to correct the selected audio data.

27. The computer program product of claim 26, where performing the correction operation comprises identifying a bounding rectangle surrounding the selected audio data and applying the correction operation to all audio data within the bounding rectangle.

28. The computer program product of claim 26, where performing the correction operation further comprises:
- identifying a plurality of frequency bands associated with the selected audio data; and
- interpolating at least one feature of the audio data over time with respect to each identified frequency band of the plurality of frequency bands.

29. The computer program product of claim 28, where interpolating a feature for a particular frequency band further comprises:
- identifying a first value for the feature of audio data occurring within a specified time prior to the selected audio data of the particular frequency band;
- identifying a second value for the feature of audio data occurring within a specified time after the selected audio data of the particular frequency band; and
- interpolating the feature of the audio data for the particular frequency band using the first value and the second value.

30. The computer program product of claim 29, where the feature is an intensity value.

31. The computer program product of claim 29, where the specified time corresponds to a specified number of samples.

32. The computer program product of claim 29, further operable to perform operations comprising:
- storing the edited audio data.

33. A system comprising:
- a user interface; and
- one or more computers operable to interact with the user interface and to perform operations including:
  - displaying a visual representation of audio data;
  - receiving an input selecting a selected portion of audio data within the visual representation, the selecting including applying a brush tool to the visual representation of the audio data, the brush tool having a particular brush size identifying a coverage area for application of the brush relative to the visual representation of audio data; and editing the selected portion of audio data including determining a degree of opacity for the selected audio data and variably applying an editing effect to audio data of the selection according to the degree of opacity.

34. The system of claim 33, where selecting audio data within the visual representation includes applying the brush tool to a plurality of non-contiguous regions of the visual representation of the audio data.

35. The system of claim 33, where applying the brush tool further comprises varying the application of the brush tool according to a rate at which the brush is moved relative to the visual representation of the audio data.

36. The system of claim 33, where applying the brush tool further comprises varying the application of the brush tool according to a number of passes of the brush tool over a particular point of the visual representation of the audio data.

37. The system of claim 33, where the visual representation is a frequency spectrogram and determining a degree of opacity for the selected audio data further comprises:
generating a mask image corresponding to the brush application within the selected audio data;
dividing the mask image into a grid including a plurality grid boxes with respect to specified time intervals and frequency bands; and
determining an opacity value for each grid box as a function of the brush tool application within that grid box.

38. The system of claim 33, where applying an editing operation according to the degree of opacity includes:
determining a minimum and maximum amount of the editing effect to apply to the selected audio data; and
determining an amount of the editing effect to apply to a particular point of audio data in the selected audio data as a function of the minimum and maximum amounts and the opacity value associated with the particular point of audio data.

39. The system of claim 33, the one or more computers operable to perform operations further comprising:
isolating a portion of the audio data, the portion corresponding to the selected portion of audio data within the visual representation.

40. The system of claim 33, the one or more computers operable to perform operations further comprising:
updating the displayed visual representation according to the applied editing effect.

41. The system of claim 33, the one or more computers operable to perform operations further comprising:
storing edited audio data after applying the editing effect.

42. A system comprising:
a user interface; and
one or more computers operable to interact with the user interface and to perform operations including:
displaying a visual representation of audio data;
receiving an input selecting audio data within the visual representation, the selecting including applying a brush tool to the visual representation of the audio data; and
automatically performing a correction operation on the selected audio data to form edited audio data, the correction operation including using a portion of the audio data from outside the selected audio data to correct the selected audio data.

43. The system of claim 42, where performing the correction operation comprises identifying a bounding rectangle surrounding the selected audio data and applying the correction operation to all audio data within the bounding rectangle.

44. The system of claim 42, where performing the correction operation further comprises:
identifying a plurality of frequency bands associated with the selected audio data; and
interpolating at least one feature of the audio data over time with respect to each identified frequency band of the plurality of frequency bands.

45. The system of claim 43, where interpolating a feature for a particular frequency band further comprises:
identifying a first value for the feature of audio data occurring within a specified time prior to the selected audio data of the particular frequency band;
identifying a second value for the feature of audio data occurring within a specified time after the selected audio data of the particular frequency band; and
interpolating the feature of the audio data for the particular frequency band using the first value and the second value.

46. The system of claim 45, where the feature is an intensity value.

47. The system of claim 45, where the specified time corresponds to a specified number of samples.

48. The system of claim 42, the one or more computers operable to perform operations further comprising:
storing the edited audio data.

* * * * *